Sept. 9, 1952 C. F. RAUEN 2,609,901
BRAKE AND STOP MECHANISM
Original Filed Sept. 19, 1938 8 Sheets-Sheet 1
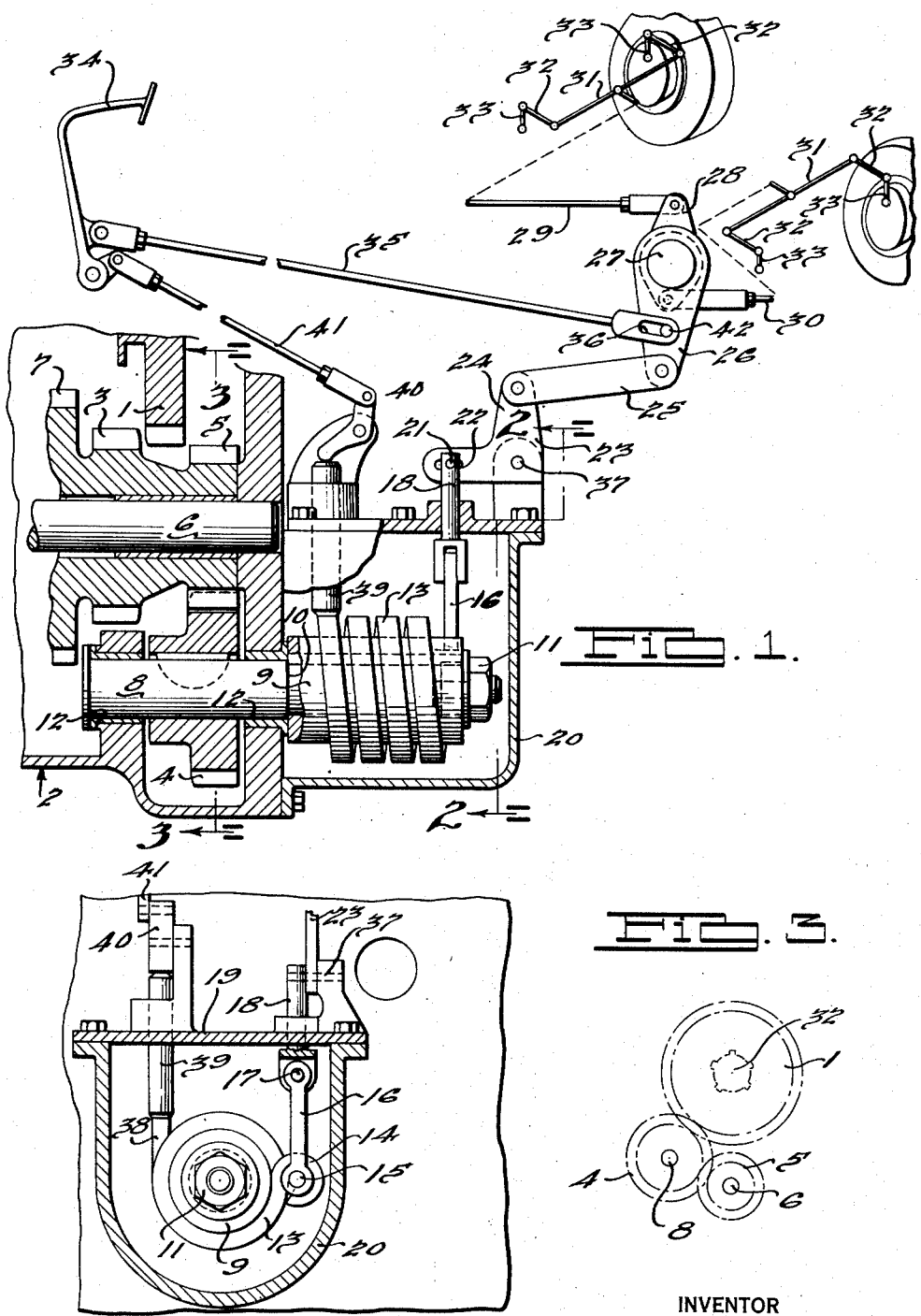
INVENTOR
Carl F. Rauen.
BY
ATTORNEYS

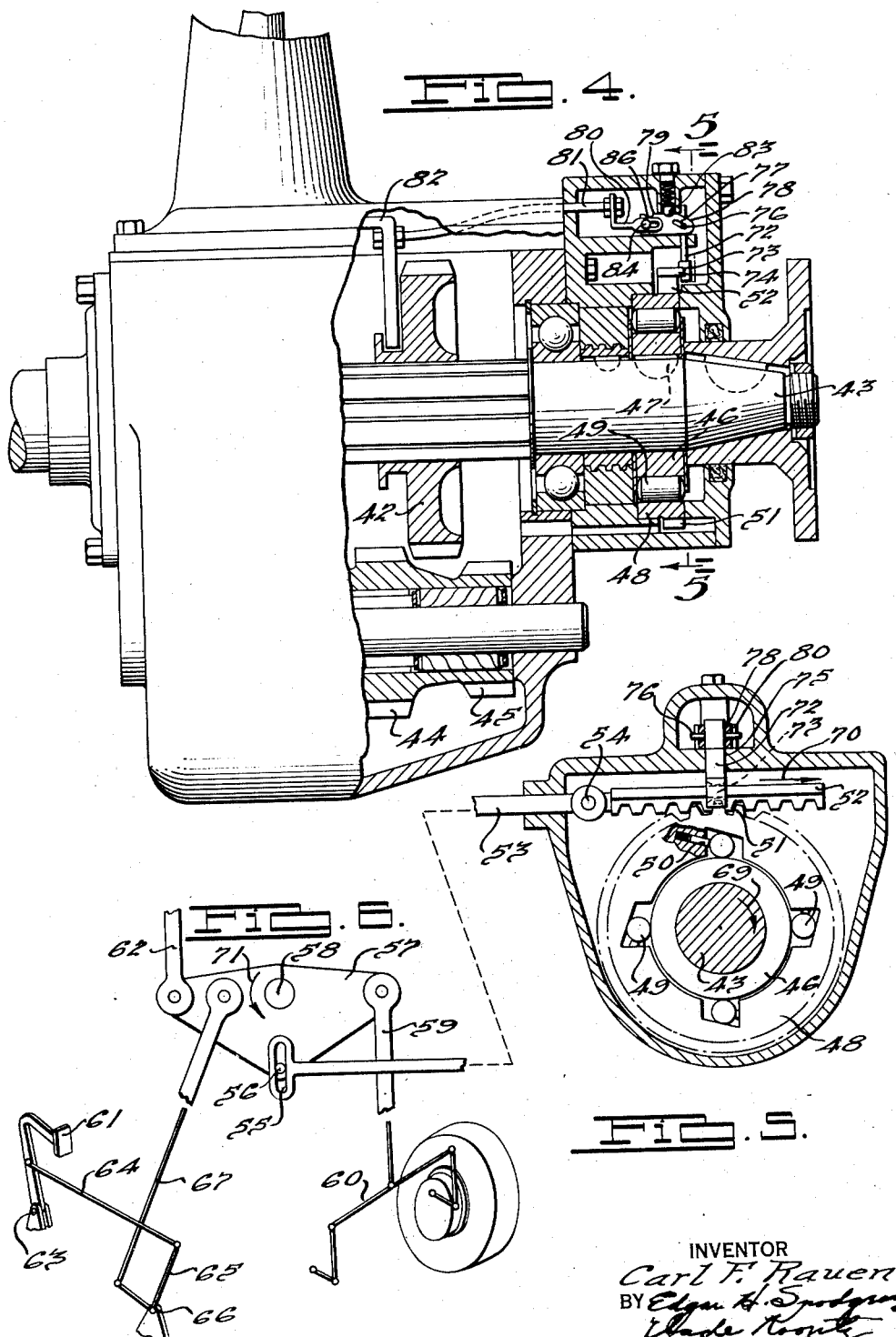

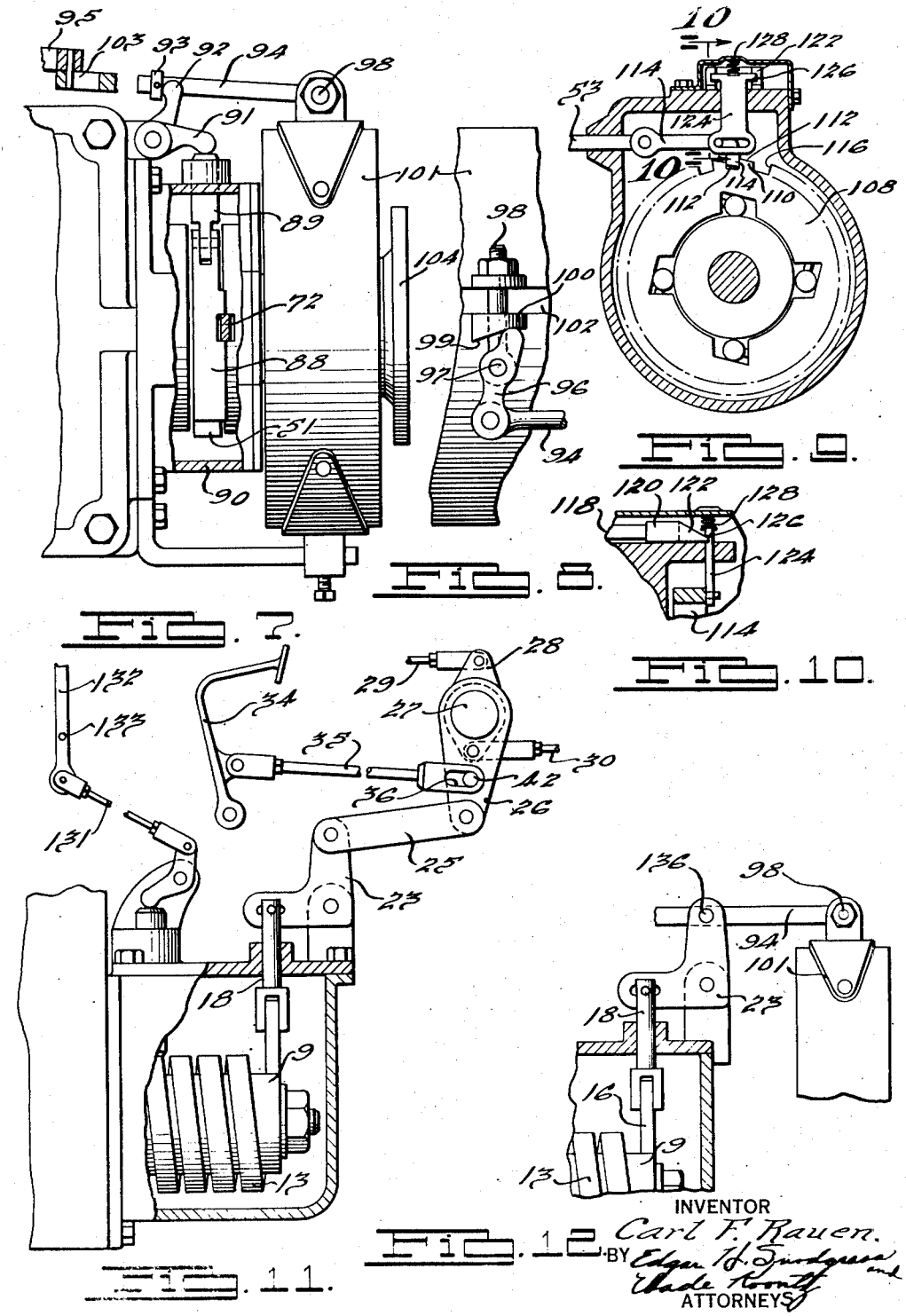

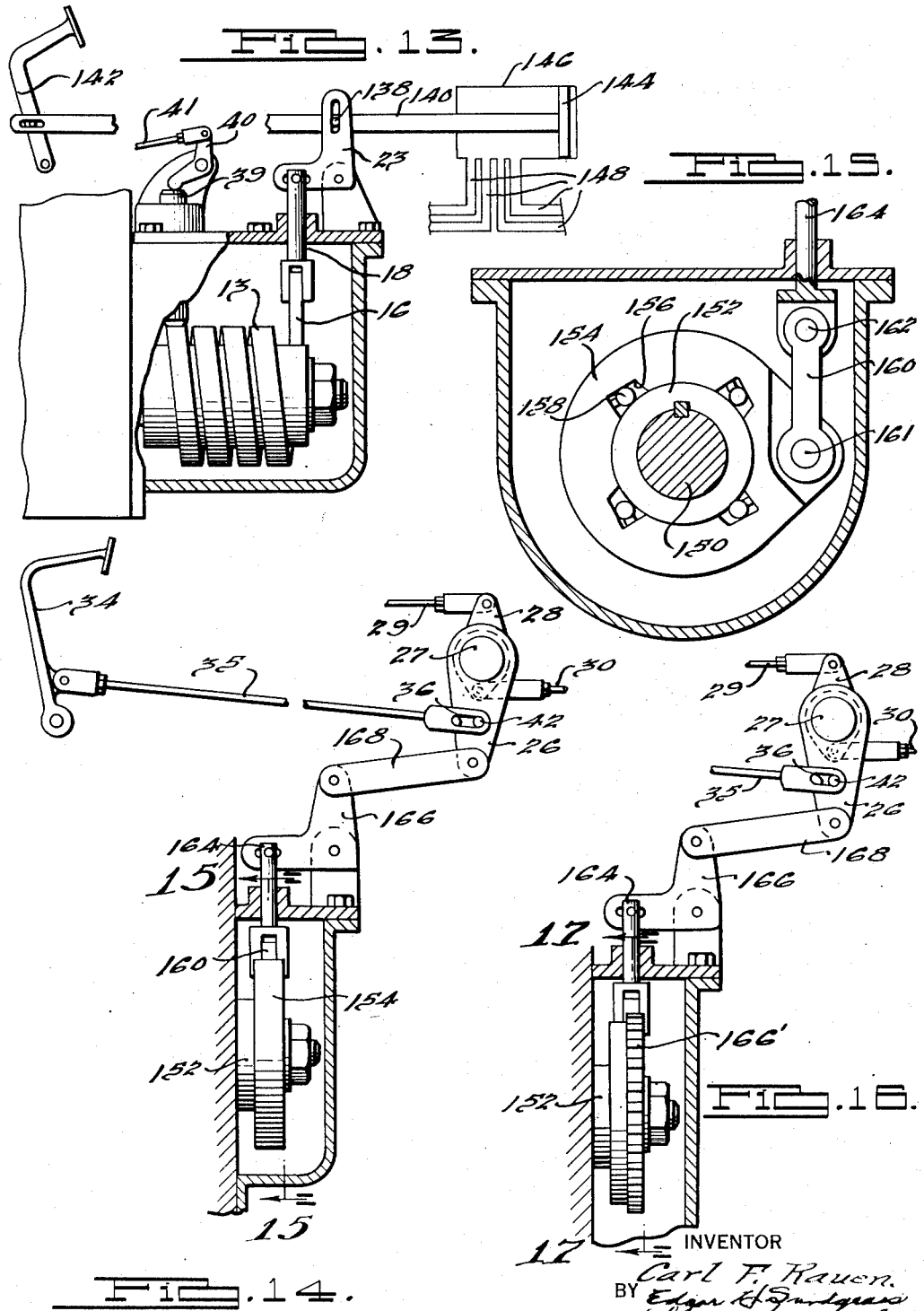

Sept. 9, 1952  C. F. RAUEN  2,609,901
BRAKE AND STOP MECHANISM
Original Filed Sept. 19, 1938  8 Sheets-Sheet 5

INVENTOR
Carl F. Rauen.
BY
ATTORNEYS

Sept. 9, 1952 C. F. RAUEN 2,609,901
BRAKE AND STOP MECHANISM
Original Filed Sept. 19, 1938 8 Sheets-Sheet 6
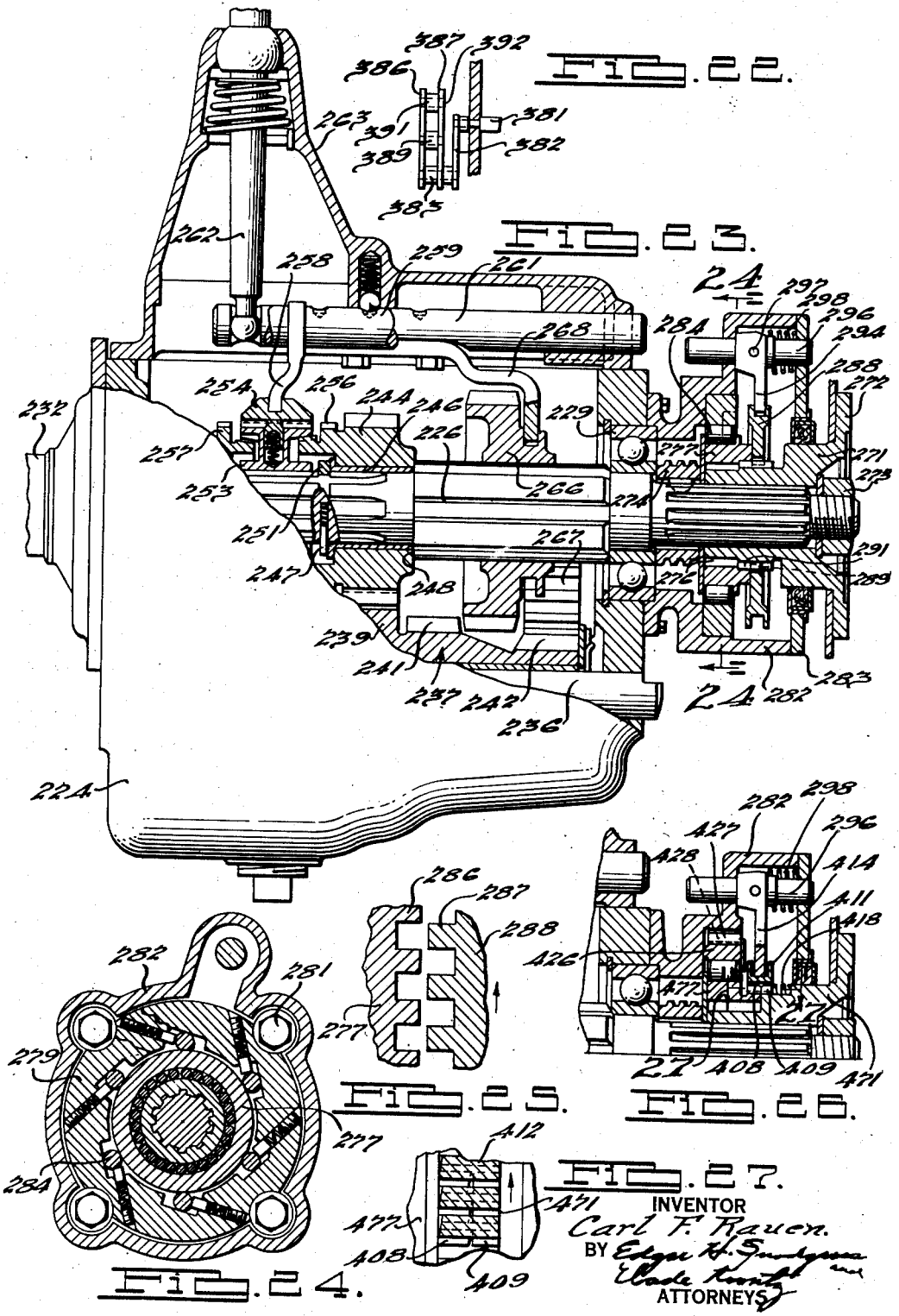
INVENTOR
Carl F. Rauen.
BY
ATTORNEYS Sept. 9, 1952          C. F. RAUEN          2,609,901
BRAKE AND STOP MECHANISM
Original Filed Sept. 19, 1938          8 Sheets-Sheet 7
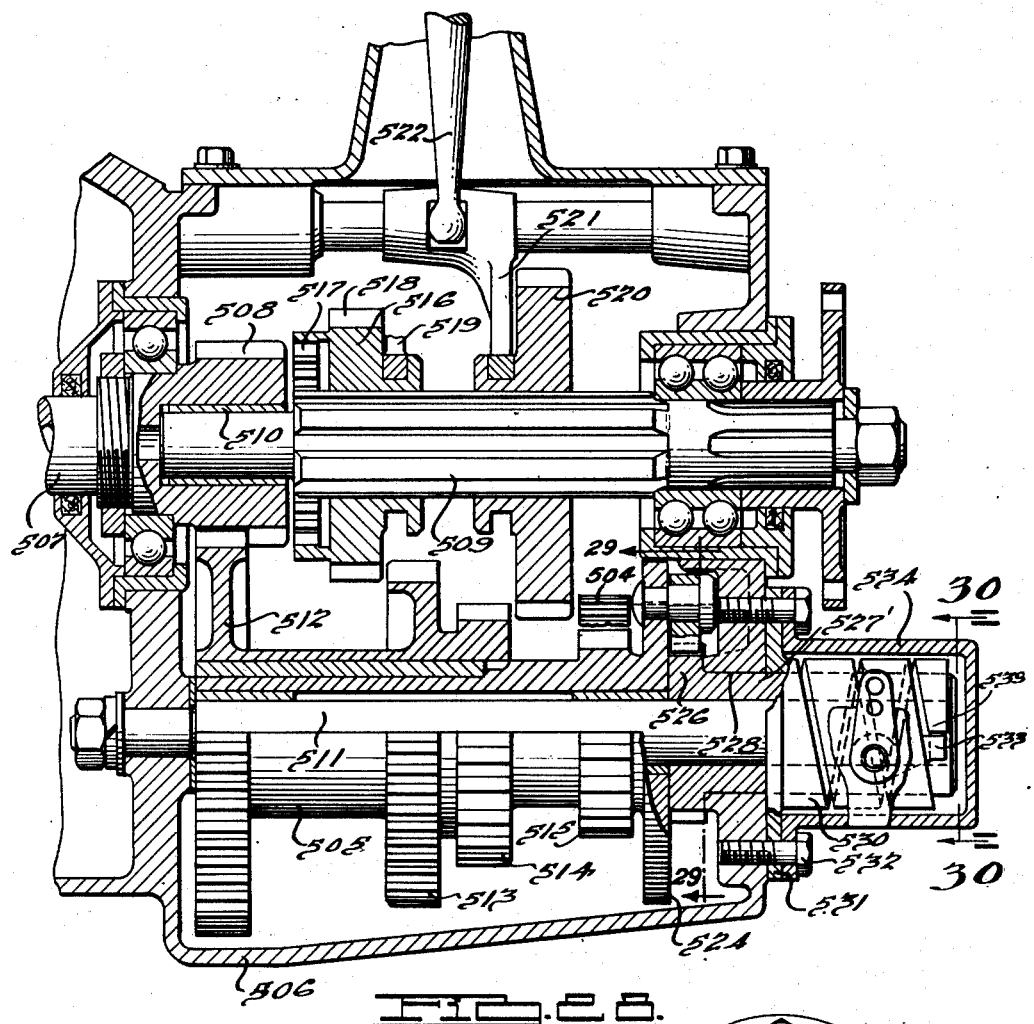
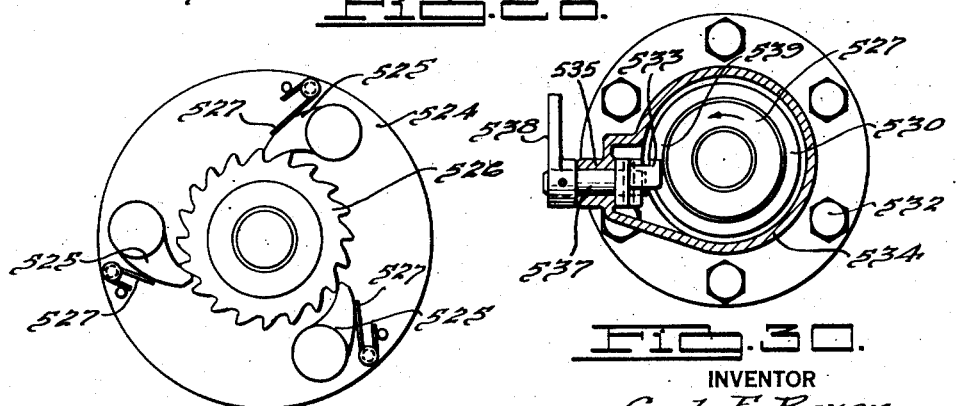
INVENTOR
Carl F. Rauen.
BY
ATTORNEYS Sept. 9, 1952          C. F. RAUEN          2,609,901
BRAKE AND STOP MECHANISM
Original Filed Sept. 19, 1938          8 Sheets—Sheet 8
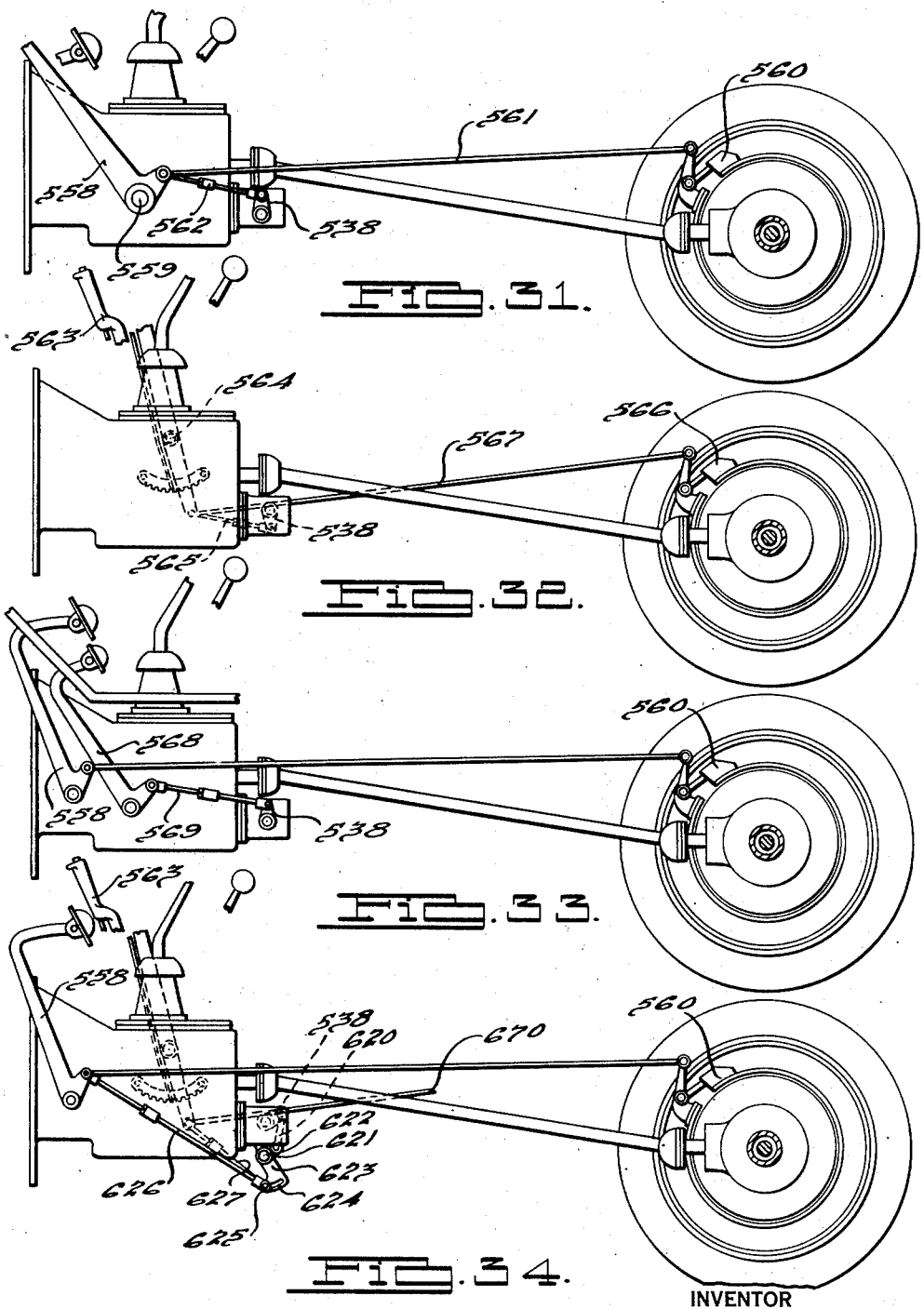
INVENTOR
Carl F. Rauen.
ATTORNEYS Patented Sept. 9, 1952

2,609,901

UNITED STATES PATENT OFFICE 2,609,901

BRAKE AND STOP MECHANISM

Carl F. Rauen, Grosse Pointe, Mich.

Original application September 19, 1938, Serial No. 230,641, now Patent No. 2,296,619, dated September 22, 1942. Divided and this application September 6, 1940, Serial No. 355,656

6 Claims. (Cl. 192—4)

(Granted under the act of March 3, 1883, as amended April 30, 1928; 370 O. G. 757)

The object of this invention is to provide a means to automatically prevent retrograde movement of a motor vehicle when it is desired to drive that vehicle up a grade. Such devices are sometimes referred to as sprags.

One way of accomplishing this is to provide a one-way clutching or brake actuating device to be operated by any of the unidirectional shafts or gears of an automobile transmission in such a manner that said one-way device will cause the application of the brakes of the vehicle when undesired downhill movement takes place due to gravity. When the brakes are applied by a one-way device operated by undesired or abnormal movement of the transmission gears, said brake will prevent backward movement of a car down an incline if the gears are set to drive it forwardly up the hill, or forward movement down an incline if the gears are set to drive the car backwardly up the hill.

Another means of accomplishing substantially the same results comprises a one-way device on the driven or propeller shaft of the transmission which will cause application of the brakes when the car tends to roll down a hill against the will of the operator.

The foregoing one-way device can be connected either to the wheel brakes or to the brake which is sometimes placed on the propeller shaft and commonly operated by the hand brake lever.

When the one-way device for operating the brakes is put on the driven or propeller shaft of the transmission, a means should be provided to release it when it is desired to drive the car in reverse. I have shown one means of doing this in this application and have shown several other methods in my copending application Serial No. 491,837, filed October 29, 1930, now Patent No. 2,299,765.

If the one-way device be operated by any of the unidirectional gears of the transmission, it would not be necessary to release the device for reverse, inasmuch as these gears always turn the same way whether the car is being driven backwardly or forwardly. Therefore, if the car is in gear and is to be driven up the hill, any retrograde movement will cause the unidirectional gears to move opposite to their normal direction of rotation and will cause application of the brakes by the one-way device. With the one-way device operated by any of the unidirectional gears of the transmission, it may be desirable to provide a release for emergency purposes, inasmuch as the car may be stopped in high gear on a hill, in which case the torque on the one-way device would come through the gear teeth, and the friction resulting from this may make it difficult to shift the gears. To this end I have provided a release, preferably connected to the foot brake pedal so that under the foregoing or similar conditions, the torque can be relieved from the gear teeth by applying the foot brake, which releases the one-way device from holding the car. The brakes, in consequence of their operation by the foot brake, hold the car until the gears are shifted to a lower speed, in which case the foot can be removed from the foot pedal, and the one-way spragging device will cause the application of the brakes to hold the car until it is driven forwardly. Under the foregoing circumstances, when the torque on the one-way device comes through the gear teeth, it also would be possible to relieve the torque from the gear teeth by applying the foot brake so as to exert more pressure on the brakes than has been applied by the operation of the one-way device in such cases where no emergency release is provided.

Another object of this invention is to provide in a spragging device a lug and tooth mechanism whereby when said lug is in mesh with said teeth, there is no relative rotation between said lug and said teeth in either direction, said lug being adapted to be removed from said teeth to permit relative rotation, the ends of said teeth and/or said lug or both being provided with cammed surfaces so that when said lug attempts to enter the space between said teeth, while said teeth are rotating relative to said lug at any appreciable speed in one direction, it will be prevented from doing so by said cammed surfaces, but said lug can enter said space only when little or no relative speed exists between said lug and said teeth or upon a reversal of rotation of said teeth relative to said lug. The foregoing structure is useful to prevent shock to the vehicle under certain circumstances and to facilitate engagement of the sprag under other circumstances, as more fully set forth hereinafter.

A further object of this invention is to provide, in a motor vehicle, a mechanism which will automatically keep the brakes applied after the vehicle is stopped by manual application of the brakes, until released by application of the engine power to the drive system or until released by an auxiliary means preferably manually controlled.

A still further object of this invention is to provide, in a motor vehicle, a mechanism which will automatically keep the brakes applied after the vehicle is stopped, by manual application of the brakes, with the transmission in either forward or reverse gear, so as to prevent movement of the vehicle in either direction, until released by application of engine power to the drive system, or until otherwise released.

Another object of the invention is to provide means for easily overcoming the frictional force set up between the several parts of a sprag mechanism when this latter is employed for holding the vehicle in a stationary position upon an inclined surface such as a hill, so that any desired change in the gear ratio may be effected.

Another object of the invention is to provide a motor vehicle with a particular type of braking mechanism which will move the vehicle slightly forward when applied, and to such an extent that the sprag or anti-reverse mechanism thereon can be released without the exertion of undue force.

Another object of the invention is to provide a simple and effective means for preventing movement of the automobile or other device in which a transmission is used, in a direction opposite from that desired.

Other and important objects of the invention will be apparent from a consideration of the following specification taken in conjunction with the accompanying drawings of which there are eight (8) sheets and wherein:

Fig. 1 is a partial view, partly in section, of a motor vehicle power transmission and brake system equipped with a device embodying my invention for actuating the wheel brakes by the reverse idler gear;

Fig. 2 is a view on the line 2—2 of Fig. 1;

Fig. 3 is a diagrammatic view on the line 3—3 of Fig. 1, showing the relationship of the gears;

Fig. 4 shows a similar device mounted on the driven shaft of the transmission;

Fig. 5 is a sectional view on the line 5—5 of Fig. 4;

Fig. 6 is an extended view of Fig. 5 and illustrating the connection of the mechanism shown therein to the brake system of the motor vehicle;

Fig. 7 is a plan view of the rear end of a transmission wherein the propeller shaft or hand operated brake is applied by a one-way device on the main shaft, and is a modification of Fig. 4;

Fig. 8 is a side elevational view of part of the propeller shaft brake shown in Fig. 7;

Fig. 9 is a modification of the construction illustrated in Fig. 5;

Fig. 10 is a view on the line 10—10 of Fig. 9;

Fig. 11 is a fragmentary view similar to Fig. 1 but illustrating a modification thereof;

Fig. 12 is a modification of the construction illustrated in Fig. 1 wherein the one-way device is utilized for operating the propeller shaft brake;

Fig. 13 is a view showing a modification of Fig. 1 and illustrating the hook-up of the one-way device shown therein to a hydraulic braking system;

Fig. 14 is a view illustrating a modified form of one-way device to that illustrated in Fig. 1 and using a roller clutch instead of a spring clutch;

Fig. 15 is a view along the line 15—15 of Fig. 14;

Fig. 16 is a view illustrating a modification of Fig. 1 employing the type of one-way device illustrated in Fig. 5;

Fig. 22 is a fragmentary sectional view of the brake mechanism shown in Fig. 21 and particularly illustrating the brake shoe actuating mechanism embraced therein;

Fig. 23 is a longitudinal sectional view, partly in elevation, of an automobile transmission having associated therewith a sprag device embodying the principles of this invention;

Fig. 24 is a vertical sectional view through the one-way clutch or brake mechanism of the sprag device, taken substantially in the plane of line 24—24 of Fig. 23;

Fig. 25 is a fragmentary sectional view illustrating a certain type of clutch engaging teeth which may be employed in a sprag mechanism such as that disclosed herein and taken along the line 25—25 of Fig. 23;

Fig. 26 is a fragmentary sectional view of a slightly improved form of the invention disclosed in Fig. 23;

Fig. 27 is a sectional view of the teeth, taken substantially along the line 27—27 of Fig. 26;

Fig. 28 is a longitudinal sectional view of an automobile transmission in which a device constructed in accordance with the present invention is applied to the countershaft;

Fig. 29 is a section on the line 29—29 of Fig. 28;

Fig. 30 is a section on the line 30—30 of Fig. 28; and

Figures 17, 19:
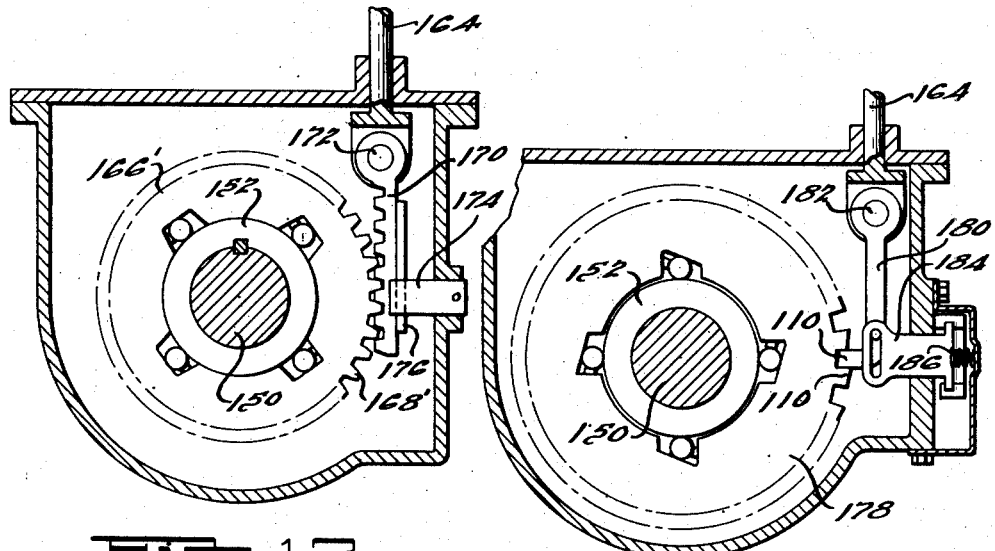
Fig. 17 is a section taken on the line 17—17 of Fig. 16.
Fig. 19 is a section on the line 19—19 of Fig. 18.

Figs. 31 to 34, inclusive, are several semi-diagrammatic views of parts of an automobile structure showing the rear axle and the transmission and showing a device constructed in accordance with the present invention, together with several forms of releasing means therefor.

Referring now to Figs. 1 to 3, wherein part of the transmission and braking systems of a motor vehicle is illustrated, the low speed sliding gear 1 of a conventional motor vehicle transmission, indicated generally at 2 and shown more in detail in Fig. 4, is adapted to be slid into mesh with the low speed countershaft gear 3 for low gear and also to be slid into mesh with the reverse idler gear 4 for reverse. The reverse idler in Fig. 1 is shown in a developed view, and its real location is shown in Fig. 3. The reverse idler 4 is always in mesh with the reverse gear 5 on the countershaft 6.

The countershaft also carries a second speed gear 7. The reverse idler 4 is keyed to a shaft 8, which in turn has keyed to it a drum 9 which is held against the shoulder 10 by a nut 11. The shaft 8 is journaled in bushings 12 in the transmission case. The drum 9 has a spirally wound clutch spring 13 mounted thereon and is in frictional engagement therewith, due to the fact that the normal internal diameter of the spring 13 is slightly less than the external diameter of the cylindrical drum 9. This frictional contact causes the spring to wind up and tightly grip the drum when the same is rotated in one direction. When the drum is rotated in the opposite direction, the spring 13 unwinds and permits rotation of the drum, with a slight, if any, frictional drag. The end 14 of the spring 13 is curled in the form of a loop and has a pin 15 extending through the loop. The ends of the pin 15 are journaled in openings provided in the bifurcated end of a link 16, the bifurcations of which straddle the loop 14. The other end of the link 16 is formed with an eye through which a pin 17 extends, said pin 17 being journaled in openings formed in the bifurcated end of a link or rod 18 which is slidably mounted in the cover plate 19 of the case 20 which is secured to the rear wall of the transmission 2 and houses the clutch spring and its associated mechanism. A pin 21 is fastened in the upper end of the link 18 and projects into a slot 22 formed in one end of a bell crank lever 23. The arm 24 of the bell crank 23 is connected by a link 25 to an arm 26 fastened to the brake cross shaft 27 of the vehicle, so as to turn therewith.

The brake cross shaft 27 carries a double armed lever 28 to which are attached the rods 29 and 30 which actuate the front and rear wheel brakes, respectively. The brake rod 29 has its other end connected to an equalizing bar 31, the ends of which are connected by links 32 to arms 33 which are carried by the wheel brake structure and connected with the shoes thereof in such a way as to actuate the same when the brake pedal 34 is depressed. The brake rod 30 is also connected at its other end to an equalizing bar 31, the ends of which are connected by links 32 to arms 33 associated with the wheel brake structure of the rear wheels for actuating the shoes thereof. The shaft 27, the lever 28, the rods 29 and 30 and the rest of the brake linkage and the wheel brakes associated therewith are normally operated by a foot brake pedal 34 which is connected to the arm 26 by a link 35. Slot 36 in the end of the link 35 is provided so that when the brakes are applied by the clutch spring 13, the arm 26 and pin 42 carried thereby, which extends into the slot 36, can move without moving the pedal 34. The direction of the spiral of the clutch spring is such that when the reverse idler 4 is rotated clockwise, as seen in Fig. 3, which is opposite to its direction of rotation when the car is being driven either backward or forward, the spring 13 will be caused to turn with the drum 9, and the end 14 of the spring will apply the wheel brakes through the medium of the links 16 and 18, the bell crank 23, link 25, arm 26, cross shaft 27 and the associated brake linkage. The bell crank 23 is pivotally mounted at 37 upon a bracket carried by the cover 19 of the case 20. As soon as the countershaft and consequently the reverse idler 4 are rotated by the engine in their normal direction, the spring clutch loses its grip on the drum 9, and the brakes are released. This releasing takes place with but very little movement of the drum 9. In fact, about all that is necessary is to apply torque to the drum in the direction to unwind the clutch spring 13.

The other end 38 of the clutch spring is adapted to be moved by a plunger 39 to cause the spring to unwind and release its grip upon the drum. This plunger 39 is moved by the action of the foot brake pedal 34 when the same is depressed, to apply the brakes, as the pedal 34 is connected to the plunger 39 by means of the bell crank 40 and the adjustable link 41. The link 41 may be connected to the hand brake or other lever, as illustrated in some of the other modifications herein disclosed, instead of to the foot brake pedal, if desired, and the link 25, instead of being connected to the arm 26, may be connected to the emergency brake, especially when this brake is located on the driven shaft of the transmission, as illustrated in some of the other modifications herein disclosed.

The clutch spring can be constructed and arranged so as to be operated directly by the countershaft gears, the drive gear, or any gear meshing with them, or the reverse idler, that normally have one direction of rotation. Instead of the spring clutch 13, other types of one-way clutches or mechanisms may be used, as is illustrated in some of the other modifications of this application.

It is to be understood that in the modification disclosed in Fig. 1, in order for the automatic brake means to become effective, it is necessary that the gears of the transmission be meshed so as to drive the car up the hill. That is, for instance, the low gear 1, which is mounted slidably on the driven or main shaft 32, must be meshed with the countershaft low gear 3 to prevent retrograde movement when the car is facing uphill, and with the reverse idler gear 4 if the car is facing downhill. Moreover, if the transmission is placed in either high or second or other intermediate gear facing uphill, it will not run backward down the hill.

In Figs. 4, 5 and 6, I have shown a modified form of device mounted on the driven or main shaft 43 of the transmission and at the rear thereof. The low gear 42 is slidably mounted on the main shaft 43 and is adapted to be slid into mesh with the countershaft low gear 44 and with the reverse idler gear (not shown) arranged similarly to the reverse idler illustrated in Fig. 1 and which meshes with the gear 45. The gears 42, 44 and 45 are equivalent to the corresponding gears shown in Fig. 1. The main shaft 43, in this modification, is provided with a one-way roller clutch drum 46 keyed to the shaft 43 at 47. The clutch cam member 48 is prevented from turning counter-clockwise, as seen in Fig. 5, with respect to the drum 46, by the rollers 49 which are operatively arranged between the cam member 48 and the drum 46. These rollers are held in position for instant action by the spring plungers 50.

The cam 48 is provided with gear teeth 51 adapted to mesh with similar teeth on the rack 52, which rack is pivoted on the rod 53 at 54. The rod 53 at its other end is provided with a slot 55 which receives a pin 56 carried by a bell crank member 57, the bell crank 57 being pivotally mounted about the point 58. A brake rod 59 having a pivotal connection at one end thereof to the bell crank 57 is connected at the other end thereof to an equalizing bar 60 which is connected by linkage to the rear wheel brakes for actuating the same upon operation of a foot pedal 61. Another brake rod 62 having a pivotal connection at one end thereof to the bell crank 57, is connected at its other end to an equalizing bar (not shown), which in turn is connected to the front wheel brakes for actuating the same upon operation of the foot pedal 61. The linkage of the brake system for the modification shown in Figs. 4, 5 and 6 is essentially of the same construction as that illustrated in Fig. 1. The foot brake pedal 61, which is pivotally mounted at 63, is connected by a link 64 to a bell crank 65 pivoted at 66, said bell crank in turn being connected by a rod 67 to the bell crank 57 for moving the same about its pivot point 58 upon actuation of the foot pedal 61.

It will therefore be seen that when the shaft 43 rotates in the direction of the arrow 69, the rack 52 will be caused to move in the direction of the arrow 70, which will cause the bell crank 57 to rotate in the direction of the arrow 71 and apply the brakes through the rods 59 and 62. As soon as the shaft 43 is rotated opposite to the arrow 69, the pull on the rod 53 is eliminated by reason of the one-way clutch, and the cam 48 is returned to its normal position under the influence of the usual brake springs.

In order that a car equipped with this device on the propeller shaft may be driven backwardly, I provide a means for lifting the rack 52 from contact with the gear teeth 51 so that the cam member 48 may turn in a clockwise direction, looking at Fig. 5, with the shaft 43. This is accomplished preferably by the gear shift mechanism when the gears are shifted to reverse, as will now be described. A member 72 is provided with a slot 73 adapted to engage the stepped part 74 of the rack member 52. The slot 73 is rounded so that the stepped part 74 can rock when the member 72 is moved vertically in the hole 75 in which it slides. A pin 76 extends from both sides of the member 72 and protrudes through the slots 77 in the arms 78 of the forked detent member 79 which straddles the member 72. Straddling the member 79 is a part 80 fastened to an extension 81 of the shift member 82 which controls the position of gear 42 for either low or reverse drive. The spring pressed ball 83 forms a detent which holds the rack 52 in its proper position when the transmission is in forward or reverse speeds. The bifurcated end of the member 80 which straddles the detent member 79 has a slot formed in each furcation thereof, and a pin 84 carried by the detent member 79 extends through said slots so as to provide a lost motion connection between the member 80 and the detent member 79.

When the car is shifted to reverse, the member 80 cooperating with the pin 84 pushes the arms 78 to the right, in Fig. 4, raising the pin 76 in the slot 77 and thereby causing the member 72 to lift the teeth on the rack 52 out of mesh with the teeth 51 of the cam member 48. When the teeth on the rack 52 are out of mesh with the teeth 51, they are held from re-meshing by the action of the members 81 and 82, the member 82 of the transmission normally being held in the position in which it may be set, by means of conventional detents (not shown). The teeth of the rack 52 will remain out of mesh with the teeth 51, even when the member 82 is actuated to shift the gear 42 to a neutral position between the gears 44 and 45, due to the fact that the right hand end of the slots into which the pin 84 extends will not contact the pin 84 upon shifting from reverse back to neutral. This is done so that the sprag device cannot be reset and suddenly stop the car or break some of the parts if the gear 42 should be pulled out of reverse position while the car is moving backwardly at any appreciable speed.

When the gear 42 is shifted into mesh with the gear 44 (low gear) through the medium of the shift fork 82, the right hand end of the slots in the member 80 contacts the pin 84 and pulls the forked detent 79 to the left until it assumes the position shown in Fig. 4, thereby permitting the teeth of the rack 52 to mesh with the teeth 51. Inasmuch as it is quite difficult to mesh the gears 42 and 44 if the car is moving backwardly at any appreciable speed, the above arrangement, by which it is necessary to shift the gear 42 into mesh with the gear 44 before the sprag again becomes effective, will make sudden strains on the car mechanism practically impossible. The detent ball 83 will prevent the slots 77 from being moved to the right (Fig. 4) under force of the member 72 resulting from the separating action of the gear teeth when the sprag is in action. It will therefore be seen that the device can readily be released when the same is under the maximum load of the vehicle by the operator exerting enough force on the shift fork 82 and the detent member 79 to disengage the ball detent 83 from the notch in which it seats, formed in the member 79.

To prevent accidental displacement of the member 79 (and consequent reengagement of the teeth of rack 52 with teeth 51) when the gear 42 is shifted from reverse to a neutral position, the member 79 may be provided with a second notch 86 positioned so as to engage the detent 83 when the gear 42 is shifted to reverse.

When the brakes are applied by the pedal 61, so as to bring the vehicle to rest, rack 52 is moved to the right, looking at Fig. 5, which causes the outer member 48 of the overrunning clutch to rotate clockwise and relative to the shaft 43 and drum 46. Rollers 49, backed up by the spring pressed plungers 50, move so as to follow the outer member 48 so that the member 48 will not rotate counter-clockwise relative to the shaft 43 and drum 46 when the brake pedal is released after the vehicle is at rest. The wheel brakes, therefore, in consequence of their operation by the foot brake pedal 61, will hold the vehicle against movement in both directions, even after the brake pedal 61 is released, and while the vehicle is so held, the gears of the transmission may be shifted. Driving of the vehicle forwardly will cause counter-clockwise rotation of shaft 43 and drum 46, and the rollers 49 to move out of wedging engagement with member 48 and the release of the usual brake springs, which will result in the automatic release of the wheel brakes when the vehicle is driven forwardly.

In the form of the invention disclosed in Figs. 7 and 8, which is a modification of the construction shown in Figs. 4, 5 and 6, and wherein the one-way device disclosed in Figs. 4, 5 and 6 is connected to a propeller shaft or transmission brake instead of to the normal wheel brakes, the brake operating mechanism including the bell crank 57 and the associated linkage disclosed in Fig. 6, is eliminated, and other mechanism, as hereinafter described, is employed. Rack 52 of Figs. 4 and 5, hereinafter referred to as rack 88 in connection with Figs. 7 and 8, is pivotally connected to rod 89 which projects through an opening in the case 90 enclosing the one-way mechanism and operates a bell crank 91 pivotally mounted on the transmission case. The other end 92 of the bell crank cooperates with a collar 93 fastened to the rod 94 extending to the hand brake lever 95 at one end and to the propeller shaft or transmission brake at the other end. Rod 94 is pivotally connected to one end of a lever 96 pivoted at 97 to the end of bolt 98. The free end of lever 96 upon movement thereof cooperates with the cam surface 99 of bracket 100 to contract the band 101 of the propeller shaft brake upon the drum 102 thereof, upon actuation of the hand brake lever 95. When the car tends to drift backwardly down a hill, the bell crank 91 is caused to turn counter-clockwise about its pivot and thereby apply the propeller shaft brake 101, 102, independently of the hand brake lever 95. Rod 94 is attached to the hand brake lever 95 by means of a slip joint 103 so that the hand brake lever 95 will not be moved when the sprag device operates. Flange 104 is for attachment to the usual universal joint and the propeller shaft. Outside of the foregoing, the construction and operation of the modification disclosed in Figs. 7 and 8 are identical to that shown in Figs. 4 and 5.

In Figs. 9 and 10 there is shown a modification of the construction illustrated in Fig. 5, wherein a different form of tooth is used on the cam member 108 (the counterpart of member 48 of Fig. 5). Each tooth 110 is provided with a cam surface 112, as is also the tooth, dog, lug or pawl 114 formed on the end of link or member 114'. Slots 116 (the spaces between the teeth 110) are made slightly larger than the tooth 114, and if the gear 42 (Fig. 4) is shifted to neutral from reverse, while the car is moving backwardly, the tooth 114, due to the action of the cam surfaces 112, will jump across the slots 116 without falling into them unless the cam member 108 is moving at little or no speed. In this case it is possible to shift from reverse to neutral or to a forward speed while the car is moving backwardly, without the sprag becoming effective, for it cannot be applied suddenly, due to the characteristics of the above teeth.

The device just referred to is released for reverse when the gear 42 is shifted to reverse, in which case the rod 118 (counterpart of rod 81 of Fig. 4), which is operated by the shift mechanism, moves the wedge member 120 having arms 122, straddling member 124 in such a manner that the wedge or cam surfaces will engage the arms 126 of member 124 and lift it, thereby pulling the tooth 114 out of mesh with the teeth of member 108. Member 124 is connected to pawl 114 by a pin and slot connection which permits lateral movement of the pawl upon application and release of the brakes. Tooth 114 will then remain out of mesh with the teeth 110 until the gear 42 is shifted to neutral, in which case the spring 128 will cause the pawl tooth 114 to drop into a tooth space 116 as soon as the member 108 stops rotating backwardly (clockwise). Inasmuch as the pawl 114 causes the brakes to be applied, it can readily be lifted out of mesh when under load, as the frictional force to be overcome in pulling the pawl 114 out of mesh with teeth 110 is only that resulting from the force required to apply the brakes, whereas if the pawl 114 had to take the whole load of the car, i. e., if it was pivoted on a fixed part of the transmission, it would be almost impossible to release it for reverse when under load. Except in the particulars heretofore described, the construction and operation of the modification illustrated in Figs. 9 and 10 are identical to that illustrated in Figs. 4, 5 and 6.

Furthermore, the load upon the pawl 114, when the brakes are applied, can be removed by applying the brakes manually (by means of pedal 61) to a point just beyond that to which they were applied automatically by means of the one-way device. That this is possible can readily be seen from the fact that the hardest the brakes can be applied is when the vehicle is pushed backwardly by another car, in which case the maximum pull on the brakes by the one-way mechanism is limited by the torque produced in the propeller shaft by sliding of the wheels, and as it is quite easy to apply the brakes manually so as to slide the wheels, it can readily be seen that the brake mechanism can be applied manually to a point just beyond that to which they can be applied automatically, and thereby remove all load from the pawl 114 so that there is no resistance to disengaging it from the teeth 110.

In Fig. 11 there is illustrated a modification of the construction shown in Figs. 1 to 3 and differing therefrom in that the link 131 (the counterpart of the link 41 of Fig. 1) is connected to a separate lever 132 pivoted at 133 instead of to the foot brake pedal 34, as shown in Fig. 1. Thus, in the modification disclosed in Fig. 11, the one-way mechanism may be released independently of operation of the foot brake pedal 34. The construction shown in this modification also will operate to automatically maintain the brakes applied after the vehicle is stopped by manual application of the brakes with the transmission in either forward or reverse gear so as to prevent movement of the vehicle in either direction until released by application of engine power to the drive system, or until otherwise released. This is due to the fact that the link 25 will, through the bell crank 23 and the link 18, upon application of the brakes by the foot brake pedal 34, cause the clutch spring 13 to rotate as a whole relative to the drum 9 (in a clockwise direction, looking at Fig. 2). When the brake pedal 34 is released, the spring 13 will grip the drum and hold the brake linkage in the position to which it was moved by the application of the foot brake pedal 34 and consequently maintain the wheel brakes applied. This will happen when the vehicle is stopped by manual application of the brakes with the transmission in either forward or reverse gear. In this way the drum 9 will be prevented from rotating by the transmission gears which will lock the drum 9 against rotation relative to the drive shaft when the transmission is in gear. Of course, as soon as the engine of the vehicle is employed for driving the vehicle either forwardly or reversely, the drum 9 will rotate in a counter-clockwise direction and will rotate the spring 13 sufficiently to release the brake linkage and the wheel brakes.

Furthermore, the load upon the teeth of the transmission gears, when the brakes are applied, can be removed by applying the brake manually (by means of the pedal 34) to a point just beyond that to which they were applied automatically by means of the one-way device, as previously described in connection with the modifications illustrated in Figs. 4 to 10. Outside of the foregoing, the construction and operation of the device illustrated in Fig. 11 are identical to that of the modification illustrated in Fig. 1.

In Fig. 12 there is a construction illustrated which is a modification of Figs. 1 and 7 and wherein the one-way device illustrated in Fig. 1 is connected to the propeller shaft brake construction illustrated in Figs. 7 and 8. Insofar as the parts of the construction illustrated in Fig. 12 are identical with those in Figs. 1, 7 and 8, the same reference characters are used.

In this construction, the link 16 is connected to the rod 18 which, through the intermediary of the bell crank 23, will actuate the parking brake 101 due to the fact that one end of the bell crank 23 is pivotally connected at 136 to the rod 94 which at one end is connected to the parking brake lever and at the other end thereof to the propeller shaft brake, for actuating the same, substantially as in accordance with the construction shown in Fig. 8.

In connection with this modification, the clutch spring 13 may be provided with a release, as per Figs. 1 or 11, or the one-way mechanism may be released, after the same has operated, by applying the brake 101 through the medium of the parking brake lever to a point beyond that at which it was applied by the one-way mechanism and thereby taking the load off the teeth of the transmission gears and permitting the transmission to be shifted. As soon as the vehicle is power driven either forwardly or reversely, the rotation of the drum 9 will restore the clutch spring 13, the links 16 and 18, and the bell crank 23 to their normal position and release the parking brake. The links 16 and 18 are arranged horizontally, and the link 18 extends from the side of the case enclosing the one-way mechanism in this construction instead of from the top of the case, as shown in Fig. 1.

In Fig. 13 there is shown a modification of Fig. 1 wherein the one-way mechanism of Fig. 1 is connected to a hydraulic wheel brake actuating system. Insofar as the construction of Fig. 13 is identical to that of Fig. 1, the same reference characters are employed. The bell crank 23 has a pin and slot connection 138 to a rod 140, one end of which is connected to the foot brake pedal 142 and the other end of which is connected to a piston 144 of a master cylinder 146 of a hydraulic wheel brake actuating system. The illustration of a hydraulic system is fragmentary and somewhat diagrammatic and includes the fluid lines 148 which are connected at one end to the master cylinder and at their other ends to the wheel brake cylinders for applying pressure thereto upon operation of the piston 144 responsive to movement of the brake pedal 142.

The emergency release including the link 41, the bell crank 40 and the plunger 39 are identical to those shown in Fig. 1, and if the link 41 is connected to the foot brake pedal 142, the construction shown in Fig. 13, except in the foregoing particulars, will operate exactly as the construction shown in Fig. 1, whereas if the link 41 shown in Fig. 13 is connected to a separate lever such as lever 132 shown in Fig. 11, then the construction shown in Fig. 13 would operate the same as that shown in Fig. 11.

Figs. 14 and 15 disclose a modified form of one-way mechanism of the construction shown in Fig. 1, which differs therefrom in that a roller clutch is used instead of a spring clutch and also in that no emergency release need be provided for the construction shown in Fig. 14, inasmuch as the same may be released by applying the brakes manually beyond the point to that which they were applied by the one-way mechanism so as to take the load off the gear teeth and then shifting the transmission to another gear. Subsequent powered driving of the vehicle will restore the mechanism to its normal position.

In Figs. 14 and 15, a shaft 150 (counterpart of the shaft 8) has keyed to it a drum 152 of a one-way roller clutch, the cam member 154 of which being provided with inclined grooves 156 in which spring-pressed rollers 158 are arranged for locking the shell 154 to the drum 152 upon relative rotation therebetween in one direction. A link 160 (counterpart of the link 16) is pivotally connected at one end thereof to a pin 161 carried by the shell and at the other end thereof to a pin 162 carried by the bifurcated end of a rod 164 (counterpart of the rod 18). Said rod 164 is connected to a bell crank 166 similar to the bell crank 23. The construction of the brake linkage to which the bell crank 166 is connected by means of link 168 is the same as that shown and described in connection with Fig. 1, and in those cases where the parts of the brake linkage shown in Fig. 14 are identical to that shown in Fig. 1, the same references as employed in Fig. 1 are used.

The construction shown in Figs. 14 and 15 will operate identically to that illustrated in Fig. 11, except that no emergency release need be provided for the construction shown in Figs. 14 and 15, inasmuch as the load on the gear teeth through which the torque comes for holding the brakes applied may be released by manual application of the brakes beyond the point to which they were applied automatically by the one-way mechanism. In Fig. 14, upon tendency of the vehicle to move down a hill and in a direction opposite to that for which the gears of the transmission are set, the shaft 150, drum 152 and shell 154 will rotate in a clockwise direction and through the medium of links 160 and 164 apply the wheel brakes.

Figs. 16 and 17 illustrate a modification of Figs. 1 and 14 employing the tooth construction shown in Figs. 4 and 5. Insofar as the parts shown in Figs. 16 and 17 are identical to those shown in Figs. 1 and 14, the same reference characters will be used. The shaft 150 of the modification shown in Figs. 16 and 17 carries the drum 152 of a one-way clutch, the shell 166' (counterpart of 154) of which is provided with teeth 168' similar to the teeth 51 of Fig. 5. A rack 170 similar to the rack 52 of Fig. 5 is provided with teeth which mesh with the teeth 168' of the shell 166', the rack being pivotally connected at 172 to a rod 164 which, as illustrated in Fig. 14, is connected to the brake linkage for actuating the wheel brakes. A member 174 pinned to the case is provided with a slot in which a guide part 176 of the rack 170 is slidable for keeping the teeth of the rack in mesh with the teeth 168'.

Aside from the foregoing, the construction and operation of the device disclosed in Figs. 16 and 17 are identical to that of the construction shown in Figs. 14 and 15.

Figures 18, 21:
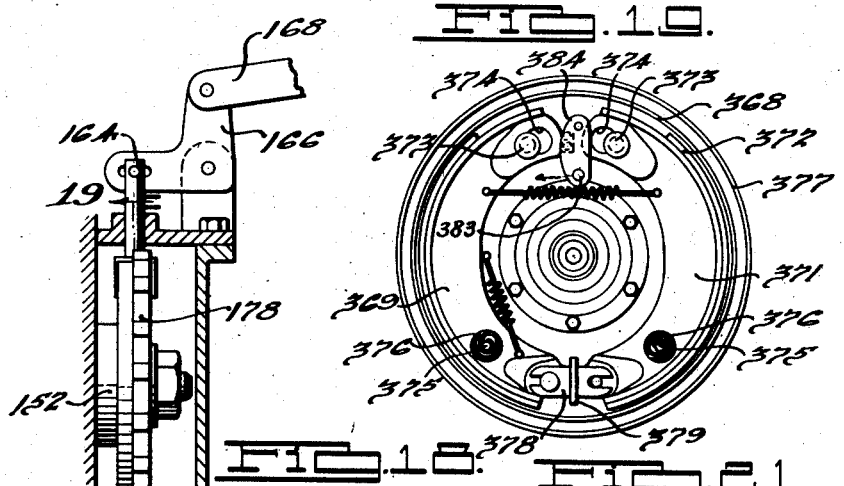
Fig. 18 is a view illustrating a modification of the construction illustrated in Fig. 1 and employing a one-way mechanism like that shown in Fig. 9.
Fig. 21 is a view of a vehicle wheel brake mechanism which may be employed in the motor vehicle disclosed in Fig. 20, in the practice of the principles of the invention.

In the construction shown in Figs. 18 and 19, which is a modification of Figs. 1 and 14 and wherein a tooth construction like that illustrated in Fig. 9 is employed, the outer member 178 of the one-way clutch is provided with teeth 110 exactly like those illustrated in Fig. 9. A pawl, tooth, dog or lug 180, corresponding to the member 114', has the end thereof shaped to provide a tooth 114 which is engageable in the space between the teeth 110 of the member 178. The member 180 is pivotally secured at 182 to a brake operating rod 164 corresponding to the rod 164 of Figs. 14 and 15, said rod being connected to a bell crank 166 which is connected by a link 168 to the brake linkage shown in Fig. 14. A bar 184 slidable in a slot in the wall of the casing around the one-way mechanism at one end thereof has a pin and slot connection with the pawl 180 for holding the tooth thereof in engagement with the teeth of the member 178. Spring 186 biases bar 184 and pawl 180 so as to engage the tooth thereof with the teeth of the member 178.

The construction shown in Figs. 18 and 19, except in the foregoing particulars, is the same as that disclosed in Fig. 14 and will operate in essentially the same manner.

Figure 20:
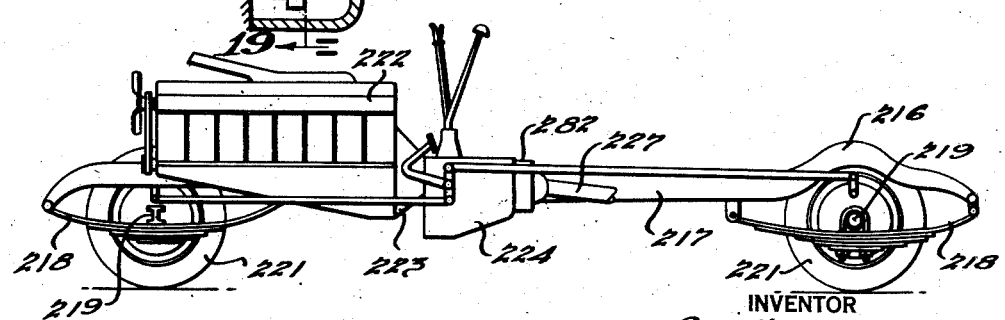
Fig. 20 is a view of a motor vehicle chassis employing a power transmission mechanism embracing the principles of the invention.

Referring now to Fig. 20, there is disclosed a motor vehicle chassis 216 embracing a frame 217, the front and rear ends of which are supported upon springs 218, axles 219 and road wheels 221.

The forward end of the frame 217 has supported thereon a motor vehicle engine 222 having a housing enclosed clutch mechanism 223 at the rear end thereof and which in turn is operatively associated with a gear transmission mechanism 224 supported rearwardly thereon. Extending rearwardly from and supported by the transmission mechanism 224 is a sprag mechanism 282 from which in turn projects a propeller shaft 227, the rear end of which is operatively associated with the rear axle 219 employed in driving the road wheels 221.

As is best shown by Fig. 23, the transmission mechanism 224 comprises a casing having a bearing 229 provided in the rear end thereof and in which is journaled a main shaft 226, the forward end of the main shaft being journaled in the rear end of the clutch shaft 232. Journaled on the shaft 236, the opposite ends of which are secured in openings formed in the casing immediately below the main shaft 226, is a gear cluster 237 comprising a plurality of gears 239, 241 and 242 and which are adapted to be employed in various combinations in driving the main shaft 226 from the shaft 232. For example, the cluster 237 is continuously driven from the clutch shaft 232 by constant mesh gears (not shown), and the gear 239 continuously drives a gear 244 which is mounted upon a bushing 246 secured loosely to the forward end of the shaft 226 between a shoulder 248 thereon and a shoulder formed on one end of the bushing 246. A ring 251 and a radially projecting pin 247 retain the bushing 246 against lateral displacement on the shaft 226.

Secured upon a splined portion of the shaft 226 and located forwardly of the gear 244 is a clutch member 253 having a sliding element 254 thereon with internal teeth, the opposite ends of which are adapted to cooperate with teeth 256 formed on the adjacent end of the gear 244 to provide a second speed drive and with teeth 257 formed on the end of the clutch shaft 232 to provide a direct drive, respectively. In order to be able to move the ring 254 from one of the aforesaid positions to the other, the outer surface thereof is provided with an annular groove in which a fork 258 is adapted to run. This fork is secured rigidly on a shift rod 259 which is slidably mounted in the cover of the transmission casing. Another bar 261, mounted similarly to the bar 259, is provided with a fork 268 for shifting the gear 266 into mesh with either the low speed gear 241 or with the reverse idler 267 which meshes with the gear 242 so as to provide a low or reverse drive. The rods 259 and 261 are adapted to be selectively operated by a gear shift lever 262 which is pivotally mounted intermediate its ends in the upper extremity of a gear shift lever supporting housing 263.

That part of the shaft 226 projecting beyond the bearing 229 is splined as indicated and has disposed thereon an internally splined sleeve 271 of a universal joint 272 which operatively connects the shaft 226 to the propeller shaft 227. Sleeve 271 is held in position by a nut 273 threaded upon the rear end of the shaft 226 and which holds the sleeve against an annular speedometer gear 274 located between the sleeve and the inner race of the bearing 229. Mounted on roller bearings 276 on the outer surface of the forward end of the sleeve 271 is a drum 277 which forms the internal element of an overrunning or one-way clutch, brake, device, mechanism or connection, the outer element or cam member 279 of which is rigidly secured by bolts 281 to the sprag element casing 282. The forward end of this casing is rigidly secured by bolts or other suitable means to the rear end of the transmission casing which in turn is rigidly secured to the vehicle frame or clutch housing as hereinbefore described.

A series of spring pressed rollers 284 are operatively arranged between the cam member 279 and the drum 277 so as to lock the parts against relative rotation in one direction and to permit relative rotation in the opposite direction. Referring to Fig. 24, the member 277 may rotate in a counter-clockwise direction relative to the member 279 when the vehicle is driven forwardly, but will be clamped to the outer element 279 which is rigidly affixed to the vehicle frame when the direction of motion of the vehicle is reversed, provided the gears are set for a forward speed or are in neutral except after being shifted to the foregoing position from reverse, as hereinafter explained.

In order to provide means for releasing the inner element 277 of the sprag device to permit the vehicle to move rearwardly when desired, the side of the element 277 remote from the transmission casing is provided with a plurality of laterally projecting teeth 286 which are adapted to mesh with an equal number of similar teeth 287 projecting from the adjacent side of a circular shifter member or ring 288. The inner periphery of this member is provided with a plurality of radially inwardly projecting teeth 289 which in turn mesh with a plurality of teeth 291 formed on the outer surface of the sleeve element 271 directly inside the shifter member. The teeth 291 are wide enough to permit the ring or disk 288 to be moved until the teeth 287 are brought into engagement with the teeth 286 or released therefrom by movement away from the inner element 277. The disk 288 is movable upon the teeth 291 by the provision in the outer surface thereof of an annular groove engaged by a fork 294, the upper end of which is secured rigidly by means of a pin 297 upon a horizontally disposed slidable shaft 296. The opposite ends of the shaft 296 are slidably disposed in openings located in the casing 282 and cover 283 in such position that the forward end of the shaft is engageable by the adjacent rear end of the rod 261. When the rod 261 is moved rearwardly to engage the teeth of the gear 266 with the reverse idler 267, the rod 296 also is engaged after a predetermined movement of the rod 261 and is moved to such an extent as to disengage the teeth 286 and 287. A spring 298 mounted on the rod 296 between the fork 294 and the cover 283 tends to maintain the rod in its forward position wherein the teeth 286 and 287 are engaged, but it is not strong enough to push the bar 261 from reverse to neutral position.

Under normal conditions, when the engine is being employed to drive the vehicle forwardly, the rod 261 of the gear shift mechanism does not engage the rod 296 of the sprag device, and consequently the teeth 286 and 287 remain in engagement and are operable for preventing rearward movement of the vehicle should the latter be stopped upon an inclined surface which might tend to cause movement in such direction. Should the vehicle be stopped under such circumstances, the rearward rotation of the vehicle wheels will be immediately effective in rotating the member 288 in the direction of the arrow in Fig. 25, which is directly opposite to the direction of its rotation when the vehicle is moving forwardly, and with the teeth 286 and 287 engaged, the member 277 will be rotated in such a manner as to lock the rollers 284 against the stationary member 279. Under such circumstances, the sprag mechanism will serve to lock the vehicle wheels to the frame, and consequently the vehicle will remain stationary even without applying the brakes.

The structure of the clutch teeth 286 and 287 is such that the same will normally prevent the vehicle from being rapidly stopped when moving rearwardly, if the shifter member 288 is released by shifting the transmission out of reverse into neutral. The teeth 286 and 287 are substantially rectangular in formation and are of so near the same width as the spaces between the teeth upon an opposite member that the spring 298 will be incapable of meshing the teeth 286 and 287 until the teeth are substantially at rest relative to one another. While the teeth disclosed in this figure might be disengaged when under a light load, by applying a considerable force upon the shift lever 262 when it is moved into reverse position, the fact that the sides of the teeth are substantially parallel to the axis of the shaft 226 will not permit them to be released under the maximum load of the vehicle.

For taking the load of the vehicle off of the teeth of the shifter member 288 so that the gearshift lever may be shifted easily into reverse position, there may be employed a braking mechanism such as that illustrated in Figs. 20, 21 and 22 and in which the brake shoes are so constructed as to move the vehicle slightly forwardly when the brakes are applied. The wheel brake structure disclosed in Fig. 21 is one such as might be employed on one of the road wheels of the vehicle illustrated in Fig. 20 and consists principally of a brake drum 368 which is rigidly secured to the wheel and within which there is located a pair of full-floating brake shoes 369 and 371. Each of these shoes is provided with brake lining 372 formed of any suitable wearing material and is held in such position as to be capable of limited substantial movement upon pins 375. At the top of the brake shoes large openings 374 are provided for receiving the pins 373, and adjacent the opposite ends thereof other large openings are provided for receiving the pins 375. In addition thereto, spiral springs 376 are employed on opposite sides of the shoes at pins 375 to permit a limited amount of lateral movement on such ends. Pins 373 and 375 all are secured rigidly to a stationary part of the vehicle surrounding the axle thereof and outwardly from which projects a skirt 377 which surrounds the brake drum 368 to prevent the entrance of dirt thereto. The lower ends of the shoes 369 and 371 are held adjustably together by an adjustable link 378 which is provided with a knurled adjusting wheel 379 by which the relative positions of the ends of the shoes may be varied.

Between the upper ends of the shoes 369 and 371 there projects through the stationary part of the braking mechanism an operating shaft indicated at 381 (Fig. 22) on the inner end of which there is secured rigidly a lever 382. This lever projects downwardly and terminates in an end portion located just below the adjacent upper ends of the brake shoes 369 and 371 and here is secured pivotally by a pin indicated at 383 to the lower end of a floating cam mechanism indicated generally at 384. The cam mechanism 384 comprises a pair of plates 386 and 387 which are held in spaced relation by a portion of the pin 383 at the lower end thereof and by blocks 389 and 391 disposed in spaced relation adjacent the upper extremities thereof in such position as to be substantially equal distances on opposite sides of the axis of the shaft 381. The blocks are held in position between the plates by pins indicated at 392.

Normally the upper ends of the shoes 369 and 371 project a short distance in between the plates 386 and 387 and they are in position to be engaged by the blocks 389 and 391. The block 389 is positioned a little nearer the end of the shoe 369 than is the block 391, and the latter conversely is nearer the end of the shoe 371 than the former. In this position, assuming the lower end of the arm 382 to be rotated in the direction of the arrow in Fig. 21, the block 389 will engage the end of the shoe 369, and the block 391 the end of the shoe 371. The two plates 386 and 387 therefore will act as a lever with a load applied at 383 by the arm 382, a fulcrum at 389 acting against the end of the shoe 369 and another load at 391 against the end of the shoe 371. Since the forces applied at 383 and 391 are in the same direction and are opposed by the reaction at 389, the force on the latter will be equal to the sum of the forces at 383 and 391 and consequently greater than the force applied at 391 alone. With the greater force applied at 389, the upper end of the shoe 369 will be thrust against the inner surface of the brake drum 368, and thereafter the resulting circumferential movement of the shoes 369 and 371 following the further movement of the block 389 will rotate the drum 368 and the wheel to which it is attached in a counter-clockwise direction until the shoes are fully engaged with the drum.

This slight forward movement of the wheel to which the brake drum 368 is attached will also tend to rotate the propeller shaft 227 to a slight extent in the same direction the shaft would be rotated were the vehicle driven forwardly under the influence of the engine. Assuming a sprag device such as that illustrated in Figs. 23 and 27 to be employed in a vehicle, the aforesaid slight forward rotation of the propeller shaft 227 will immediately relieve substantially all of the load being carried by the rollers 284, the same as the load on these rollers would be relieved in the event the vehicle were driven forwardly under the influence of the engine. Inasmuch as whatever load is carried by the rollers 284 is transmitted through the shifting ring 288, it is apparent that the shifting ring can be easily moved in response to the operation of the gearshift lever whenever the braking mechanism is so applied as to tend to rotate the propeller shaft 227 forwardly. Hence the only thing which it is necessary to do in order to relieve the load upon a sprag device such as that illustrated herein is merely to apply the brakes in a vehicle equipped with a mechanism such as that illustrated in Figs. 20, 21 and 22, and thereafter the gearshift lever can easily be shifted into reverse position to disengage the teeth 286 and 287.

In the structure disclosed in Figs. 26 and 27, the stationary element 426 is provided with a plurality of externally projecting radial teeth or splines 427 which cooperate with complementary teeth or splines 428 formed upon the inner surface of the casing 282. These teeth or splines may be made with a slip fit so that the stationary element can be inserted or removed without resorting to the expedient of removing and replacing bolts such as those indicated at 281 in the preceding figures. The inner element 477 (counterpart of 277 of Fig. 24) is provided with a rearwardly projecting part from the outer edge of which teeth 408 project outwardly in a radial direction. These teeth are disposed directly opposite teeth 409 formed on the adjacent edge of the sleeve 471 (counterpart of 271). Disposed outwardly of the teeth 408 and 409 is a slidable ring 411 on the inner surface of which are formed teeth 412 which are adapted to mate with the teeth 408 and 409 except that the teeth 412 are long enough to overlap both sets of teeth disposed inwardly thereof. A groove formed in the outer surface of the ring 411 is adapted to receive a fork 414 which is secured rigidly upon the shaft 296. A spiral spring 418 may be arranged between the ring 411 and the adjacent edge of the enlarged portion of the sleeve 471.

The outer extremities or ends of the teeth 408 and 412 are formed at a slight angle with respect to a plane normal to the axis of the shaft 226, the angle of these teeth being such as to render it practically impossible to engage the teeth from a disengaged position when the member 411 is moving in the direction of the arrow shown in Fig. 27, relative to the member 477. However, as soon as such relative movement between the parts is practically eliminated, the springs 298 and 418 will cause the teeth 412 to shift into mesh with the teeth 408, assuming that the transmission has been shifted out of reverse into neutral. This construction of the ends of the teeth 408 and 412 will prevent sudden reengagement of the teeth when the vehicle is moving rearwardly, if the transmission is at such time shifted out of reverse into neutral.

In Figs. 28 to 30 I have shown another form of self-energizing or self-wrapping device and have located it on the countershaft of the automobile transmission. I have illustrated the transmission in some detail, the same comprising the casing 506 in which is journaled one end of the usual drive shaft 507, said shaft carrying within the casing 506 a pinion 508. The driven shaft 509 has its one end journaled in a wall of the casing and has its opposite end journaled in a socket 510 formed in the end of the drive shaft 507. A countershaft 511 parallels the driven shaft 509 and has journaled thereon a spool or gear cluster 505, comprising a gear 512 which is constantly in mesh with the pinion 508, and the second and low speed pinions 513 and 514 respectively. A reverse drive pinion 515 is, in the embodiment shown, also a part of the cluster 505. A gear 516 is slidably splined on the driven shaft 509 and is provided with internal teeth 517 adapted to be meshed with the pinion 508 to provide a direct driving connection between the drive shaft and the driven shaft and is further provided with external teeth 518 adapted to be meshed with the teeth of the pinion 513 for a second speed driving connection between the driving and driven shafts. A shifter fork 519 of usual construction is provided for shifting the gear 516. A gear 520 also slidably splined on the shaft 509 is shifted through the medium of a fork 521 and may be selectively meshed with the pinion 514 for a low speed forward driving connection or with an idler gear 504 constantly in mesh with the reverse drive pinion 515. Shift lever 522 is operable for selectively shifting the forks 519 and 521.

As shown in this figure, the spool or cluster gear 505 is provided with a plate 524 on which are mounted pawls 525 adapted to cooperate with the ratchet 526. Pawls 525 are staggered with relation to the teeth of the ratchet, as shown in Fig. 29, and will pull away from the ratchet under the influence of centrifugal force and against the springs 527, thereby preventing clicking of the pawls on the ratchet teeth when the car is moving. These pawls and springs are so designed that at the normal idling speed of the engine there will be no clicking of the pawls on the ratchet teeth. The ratchet 526 is equipped with a drum portion 527' which has a bearing in the transmission housing at 528 and which is provided with a central bore for receiving one end of the stationary countershaft 511. A spring clutch member 530 is disposed about said drum 527, the latter having an outside diameter slightly larger than the internal diameter of the spring clutch member 530. This spring clutch, as shown, may be formed from a piece of tubing and is provided with a flange 531 which is non-rotatably anchored to the transmission case by the clutch spring housing 534 and bolts 532. The tube may be milled with a spiral groove to give it the characteristics of a spring. The ratchet wheel 526 is provided with an even number of teeth, and the three pawls 525 are unequally spaced angularly around the ratchet wheel so as to provide a staggered relationship between the pawls and the teeth. The spring 530 prevents rotation of the drum 527 in the direction indicated by the arrow in Fig. 30, which direction is opposite to the normal direction of rotation of countershaft spool 505.

However, no restraint against movement in the opposite direction is placed on the drum 527 by the clutch 530. A release lever 533 is carried by a shaft 537 journaled in the side of the housing 534 and in the boss 535, and said shaft also carries a lever 538 disposed without the housing. The lever 533 is adapted to engage the free end 539 of the spring clutch to cause unwinding of the spring, thereby permitting the drum 527 to turn in the direction indicated by the arrow in Fig. 30. The lever 538 of this release mechanism is provided with several holes for selective connection with an actuating rod, and said lever 538 is preferably connected either to the hand brake lever 563 of a vehicle, as shown in Fig. 32, or the foot brake pedal 558, as shown in Fig. 31. Said lever may, however, be connected to an independent pedal 568, as shown in Fig. 33, said pedal being so disposed as to be conveniently engageable by the operator's foot as he applies the foot brake, so that whenever the brakes are applied or the separate pedal is operated, the lever 533 will cause the spring to unwind, thereby releasing the sprag from holding the car, its holding function being thereby transferred to the normal brakes of the automobile. The need of this release is for emergency purposes only and will be apparent from the following description of the operation of the device.

As disclosed in Fig. 28, the device will prevent rotation of the countershaft spool 505 in one direction only and will consequently prevent rotation of the drive gear also in one direction only, and inasmuch as the reverse idler gear is constantly in mesh with the gear 515, the device will prevent the idler gear from rotating in one direction only. When the gears of the main shaft are in neutral and the engine running with the clutch engaged, the countershaft is turning, and the pawls 525, due to centrifugal force, are swung out from contact with the ratchet teeth 526.

Now let us suppose it is desired to drive the car up a hill, either backwardly or forwardly. The engine clutch is released, the countershaft stops rotating, and the low or reverse gears are meshed, and inasmuch as the countershaft, reverse idler and drive gear turn in the same direction regardless of which direction the vehicle is to be driven, it will be seen that any force such as gravity tending to cause the countershaft to rotate in a direction opposite to its normal direction of rotation will immediately cause the pawls 525 to engage with the teeth of ratchet 526 and arrest such undesired rotation inasmuch as the drum, which is part of the ratchet 526, will be prevented from moving by the spring clutch. Let us suppose that the car has been stopped facing uphill with the gears in either high, second or low; in which case the spragging device will come into operation and prevent retrograde movement of the car. If it is now desired to drive the car backwardly, or if the car has been stopped in high gear and it is now desired to start it in low gear, the operator will find, on trying to shift the gears to the neutral position, that he is unable to do so. This is caused by the friction between the gear teeth due to the load of the car coming on to the sprag through the medium of the gear teeth, which cannot readily be overcome with the ordinary shift lever. Therefore, in order to shift to neutral, it will be necessary either to release the sprag device or to move the car forward so that the gears can be pulled out of mesh at a period of no stress. However, it is not always possible to move the car forward; therefore, a releasing means somewhat of the nature shown in Fig. 28 must be provided. This releasing means consists of the levers 538, 533, and their cooperative parts which are connected to suitable operating mechanism as heretofore briefly described and more particularly described hereinafter in connection with Figs. 31, 32 and 33.

When the operator of a vehicle stops on the hill and finds that he is unable to pull the gears out of mesh, he immediately applies the brake pedal, which frees the sprag, and, in turn, causes the brakes to hold the car from moving down the hill. He is therefore able to shift to any gear which he desires, and then, upon release of the brake pedal, the sprag again takes hold and prevents movement of the car in a reverse direction if the transmission is positioned to drive the vehicle forward; or, in a forward direction, if the transmission is positioned to drive the vehicle rearward. By connecting the release mechanism for operation by the brake pedal, I also prevent any sudden application of the spragging device in the case where the car is in reverse gear and moving forwardly or in the case where the car is in forward gear and moving rearwardly; whereas, if a separate release pedal is used, and if the car is in a forward gear and moving backwardly down the hill after the sprag has been released, and if then the sprag is suddenly applied by relieving pressure on the sprag pedal, there will be a sudden stoppage of the car with a strain on the parts, and possibly breakage.

Fig. 31 is a more or less diagrammatic view of an automobile transmission and brake system in which a foot brake lever 558 is pivoted on the transmission case at 599 and is shown connected to the rear wheel brakes 560 by means of rod 561. In the case of four-wheel brakes, the connection will be changed accordingly. Attached to the brake lever is a rod 562, which rod is preferably made up of two adjustably connected parts, and said rod is also connected to the lever 538 shown in its operative relation in Fig. 28.

When the brake lever 558 is depressed, it causes the brakes to be applied and also causes the lever 538 to rotate in a counter-clockwise direction. This rotation of the lever 538 causes the spring clutch 530 to unwind, thereby freeing its grip on the drum and removing all load from the gear teeth caused by any sprag action so that the gears of the transmission may be shifted as desired.

It will therefore be noted that when the brakes are applied by the lever 558, the sprag is freed, and when the brake pedal 558 is released, the sprag is engaged and will hold the car, provided the gears are meshed to drive the car up a hill.

Fig. 32 discloses a modification of the arrangement shown in Fig. 31, wherein the hand brake lever 563, which is shown pivoted on the transmission case at 564, is connected to the sprag release lever 538 by means of the adjustable rod 565. The lower end of the hand brake lever is connected to the emergency brake 566 by means of the rod 567.

When the hand brake lever 563 is moved in a clockwise direction, it causes clockwise rotation of the lever 538 and thereby releases the sprag and applies the brake in a manner similar to that described in connection with the device of Fig. 31.

Fig. 33 shows an arrangement wherein the sprag release lever 538 is connected to a separate pedal operated lever 568 through the medium of an adjustable rod 569. It will therefore be seen from this arrangement that the sprag can be released by a separate pedal independent of any of the brake mechanism, if such a construction is desired. If desired, the pedal 568 may be so disposed that it may conveniently be engaged by the foot of the operator as such foot is used to depress the foot brake pedal 558.

Fig. 34 shows an arrangement which is a combination of the devices shown in Figs. 31 and 32; that is, the sprag release lever 538 is connected through the medium of slip joint mechanism to both the hand brake lever 563 and the foot brake pedal 558. One such connection may comprise a link 620 pivoted at its one end to the lever 538 and at its other end to a lever 621 pinned to a shaft 622. Said shaft likewise carries a pair of arms 623, each of which is formed with an arcuate slot 624. A pin 625 mounted in the slot of one of the arms is connected to one end of a rod 626 which is connected to the foot brake pedal 558, while a rod 627 similarly connects the lower end of the brake lever 563 with the other of said arms 623. This arrangement permits the sprag to be freed by operation of either the hand brake or foot brake or both. The rod 670 provides a connection from the lever 563 to the emergency brake band.

This application forms a continuation in part of my prior copending applications Ser. No. 491,837, filed October 29, 1930, for "Means for Preventing Retrograde Movement of Motor Vehicles and the Like," now Patent No. 2,299,765; Ser. No. 498,263, filed November 26, 1930, for "Brake," now abandoned; Ser. No. 230,641, filed September 19, 1938, for "Sprag," now Patent No. 2,296,619; and Ser. No. 689,204, filed September 13, 1933, for "Sprag," now Patent No. 2,251,956.

While several specific embodiments of my invention have been illustrated and described, I contemplate that the several parts of the construction shown may be used interchangeably and that many modifications may be made in the construction thereof without departing from the broad scope of the invention, and for such reason I do not desire to be limited to any particular form or arrangement except insofar as such limitations are included in the following claims.

I claim:

1. In a motor vehicle, a transmission having a unidirectional driving member, brake means, one-way clutch mechanism directly associated with said member and operable for actuating said brake means so as to prevent retrograde movement of the vehicle both forwardly and reversely when the transmission is arranged for driving said vehicle uphill, a device actuated at will for operating said brake means, and means comprising a shiftable part of said transmission for rendering said mechanism inoperable to actuate said brake means.

2. In a motor vehicle, a transmission, manually operable brake means for stopping said vehicle, a shaft operatively connected with the road wheels of the vehicle, a mechanism operatively connected with said shaft and with said brake means and operable for automatically applying said brake means for resisting the load of the vehicle, due to the tendency thereof to move downhill, so as to prevent downhill movement of the vehicle, and driver operated means operable for rendering said mechanism inoperable when said mechanism is subjected to the maximum load of said vehicle while preventing downhill movement thereof.

3. In an automobile having a drive shaft and equipped with brakes and a means for applying the brakes, the combination of means including a spring clutch acting automatically upon bringing the automobile to rest through application of the brakes to maintain said brakes applied against movement of the automobile in either direction after the brake applying force has been removed, and means operable for releasing said brakes when the same are being maintained applied.

4. In a motor vehicle provided with hydraulic brakes and a drive system, a brake pedal operable for applying said brakes, mechanism operatively associated with said brakes and drive system and controlled in part by said drive system and subsequently and automatically operable for maintaining said brakes in an applied condition, after the vehicle is stopped by an application of the brakes and the brake pedal is released, so that the vehicle will not be free to move in either direction, said mechanism including a device, independent of the brake pedal, operable for rendering said mechanism inoperable, when said mechanism is maintaining said brakes applied, so as to automatically release said brakes incidental to motor powered movement of said vehicle, and a manipulative device operatively associated with said mechanism and operable for releasing said brakes when said mechanism is maintaining said brakes applied.

5. In a motor vehicle having a motor, a drive system operable for transmitting power from the motor to the wheels of said vehicle, a hydraulic braking system including a brake pedal operable for applying the brakes of the system to stop said vehicle, the combination therewith of means operatively associated with the brake system and the drive system and subsequently and automatically operative upon bringing the vehicle to a stop by actuating said brake pedal to apply the brakes of said system, to maintain said brakes applied after the brake pedal is released, said means including a device, operatively associated with and driven by said drive system, and being arranged so as to be operable, when said drive system is operative, for preventing said means maintaining said brakes applied after an actuation and release of said brake pedal when the momentum of the vehicle is driving the motor thereof, and a manipulative device operatively associated with said means and operable for releasing said brakes when said means is maintaining said brakes applied.

6. In a motor vehicle having a motor, a drive system operable for transmitting power from the motor to the wheels of said vehicle, a hydraulic braking system including a brake pedal operable for applying the brakes of the system to stop said vehicle, the combination therewith of means operatively associated with the brake system and the drive system, and subsequently and automatically operative, upon bringing the vehicle to a stop by actuation of said brake pedal to apply the brakes of said system, to maintain said brakes applied after the brake pedal is released so that the vehicle will not be free to move in either direction, said means including a rotatable member operatively associated with and driven by said drive system and being arranged so as to be operable when said drive system is operative for preventing said means maintaining said brakes applied, after an actuation and release of said brake pedal, when the momentum of the vehicle is driving the motor thereof.

CARL F. RAUEN.

REFERENCES CITED

The following references are of record in the file of this patent:

UNITED STATES PATENTS

| Number | Name | Date |
|---|---|---|
| Re. 12,098 | Mahoney | Mar. 10, 1903 |
| 691,724 | Mason | Jan. 21, 1902 |
| 1,149,779 | Orelli | Aug. 10, 1915 |
| 1,309,945 | Kellum et al. | July 15, 1919 |
| 1,526,011 | Reinhold | Feb. 10, 1925 |
| 1,623,382 | Bowers et al. | Apr. 5, 1927 |
| 1,657,356 | Gunderman | Jan. 24, 1928 |
| 1,800,520 | Freeman et al. | Apr. 14, 1931 |
| 2,135,897 | Jameson | Nov. 8, 1938 |
| 2,175,061 | Matson | Oct. 3, 1939 |
| 2,181,700 | Leichsenring | Nov. 28, 1939 |